United States Patent
Loza et al.

[11] Patent Number: 6,032,027
[45] Date of Patent: Feb. 29, 2000

[54] HOLDING ARRANGEMENT FOR A TELEPHONE OPERATING ELEMENT IN A VEHICLE

[75] Inventors: Santiago Dueñas Loza, Ammerbuch; Tilo Volkmann, Sindelfingen, both of Germany

[73] Assignee: DaimlerChrysler AG, Germany

[21] Appl. No.: 08/993,301

[22] Filed: Dec. 18, 1997

[30] Foreign Application Priority Data

Dec. 18, 1996 [DE] Germany .............................. 196 52 715

[51] Int. Cl.[7] ......................................................... H04Q 7/20
[52] U.S. Cl. ............................. 455/90; 455/575; 455/100
[58] Field of Search ................................. 455/90, 575, 96, 455/97, 99, 100

[56] References Cited

U.S. PATENT DOCUMENTS

| | | | |
|---|---|---|---|
| 4,723,281 | 2/1988 | Peiker et al. | 455/90 |
| 4,868,862 | 9/1989 | Ryoichi et al. | 455/90 |
| 5,556,017 | 9/1996 | Troy | 455/90 |
| 5,559,863 | 9/1996 | Hashimoto | 455/90 |
| 5,896,564 | 4/1999 | Akama et al. | 455/90 |

FOREIGN PATENT DOCUMENTS

9312439 U  1/1994  Germany .
4340516A1  6/1995  Germany .

*Primary Examiner*—Wellington Chin
*Assistant Examiner*—Tilahun Gesesse
*Attorney, Agent, or Firm*—Evenson, McKeown, Edwards & Lenahan, P.L.L.C.

[57] ABSTRACT

A holding arrangement for the operating element of a telephone or a mobile telephone, such as a telephone receiver with a dialing keyboard or a handset, for an installation in a container existing in a vehicle is disclosed. A receiving device for releasably fixing the operating element and a holding body carrying the receiving device are provided. The holding body can be swivelled about a swivelling axis aligned transversely to its longitudinal course from a removed position with the operating element stored in the container into an offered position with the operating element situated to be easily gripped, and vice versa. For the purpose of a universal installation into all vehicle types in a space-saving manner, with a still remaining free useful space in the container, a fork-shaped carrier is provided for the swivel bearing of the holding body, which fork-shaped carrier accommodates the swivelling shaft in two carrying arms which project at a right angle from a carrying plate. The swivelling shaft is arranged at such a vertical distance from the holding body that, in its removed position, the holding body is disposed below the swivelling axis and, in its offered position, it is situated above the swivelling axis.

23 Claims, 2 Drawing Sheets

HOLDING ARRANGEMENT FOR A TELEPHONE OPERATING ELEMENT IN A VEHICLE

BACKGROUND AND SUMMARY OF THE INVENTION

This application claims the priority of German application 196 52 715.5-21 filed in Germany on Dec. 18, 1996, the disclosure of which is expressly incorporated by reference herein.

The invention relates to a holding arrangement for the operating element of a telephone or a mobile telephone, such as the telephone receiver with the dialing keyboard or the handset, for installation in a vehicle.

In the case of a known holding arrangement of this type (German Patent Document DE 93 12 439 U1), the holding body is formed by the container lid whose swivelling axis aligned transversely to the longitudinal direction of the vehicle is defined on the upper edge of the container which is in the front in the driving direction. The receiving device for the operating element is arranged on the bottom of the container lid such that in the offered position, in which the container lid is folded from the container toward the front at an obtuse angle, the operating element projects out of the container lid and can be gripped in a comfortable manner. In the removed position, when the telephone is not in use, the container lid is folded onto the container and the operating element is disposed in the closed container.

An armrest is also known which is arranged between two front seats of a passenger car (German Patent Document DE 4340516 A1), which consists of a center part and side parts on both sides, in which case the center part is swivellably disposed in the forward end area about a horizontal axis with respect to the side parts on both sides and can be moved between a position in which it is folded out toward the front and a position in which it is folded in toward the rear. On the side which faces away from the upper armrest surface, the center part is used for receiving a telephone.

It is an object of the invention to provide a holding arrangement for the operating element of a telephone or a mobile telephone of the initially mentioned type which can be universally installed in a space-saving manner in all vehicle types; after the installation in the vehicle-side container, still leaves usable free space in the container, and is distinguished by a high operating comfort.

This object is achieved according to the invention by *

The holding arrangement according to the invention has the advantage that, when the telephone is not in use, the holding body with the operating element of the telephone or mobile telephone rests in its removed position on the base of the container and thus the container space situated above it can still be used for other depositing purposes and, when the telephone is used, the holding body in its offering position offers the telephone operating element to the user in an easily gripped position. The utilization of the container interior in the removed position of the holding body can take place, for example, in that the container lid is provided with a closable depositing tray which, when the container lid is folded onto the container, dips into the free container interior above the holding body. The carrier, and here particularly the carrying plate to be fastened on the bottom of the container, is designed to be connected to the vehicle, that is, adapted to the dimensions of the containers existing in the various vehicle types, so that the universal usability of the holding arrangement is ensured. The fastening of the carrier on the container bottom also contributes to keeping the free space which is still usable of a volume which is as large as possible.

Advantageous embodiments of the holding arrangement according to the invention with expedient developments and further developments of the invention are described herein.

According to an advantageous embodiment of the invention, the holding body is loaded by a driving spring in the swivelling direction to its offered position and, in its removed position, is locked by means of a locking device against a swivelling by the driving spring. The locking device is preferably constructed such that, when the holding body is moved into its removed position, it automatically locks this holding body. Because of the construction of this locking device as a so-called touch system, the locking can be released by a slight pressure on the locked holding body. These constructive measures as well as a provided locking of the holding body in its offered position, ensure a high operating comfort when using the telephone or the mobile telephone.

According to a preferred embodiment of the invention, the holding body consists of a carriage bed and a sliding carriage which is longitudinally guided in it and on which the receiving device for the operating element is arranged. By the pulling-out of the sliding carriage, the use of the telephone or mobile telephone can be improved, particularly when the position of the driver seat or front passenger seat is adjusted toward the front.

Other objects, advantages and novel features of the present invention will become apparent from the following detailed description of the invention when considered in conjunction with the accompanying drawings.

DETAILED DESCRIPTION OF THE DRAWINGS

Figure 1:
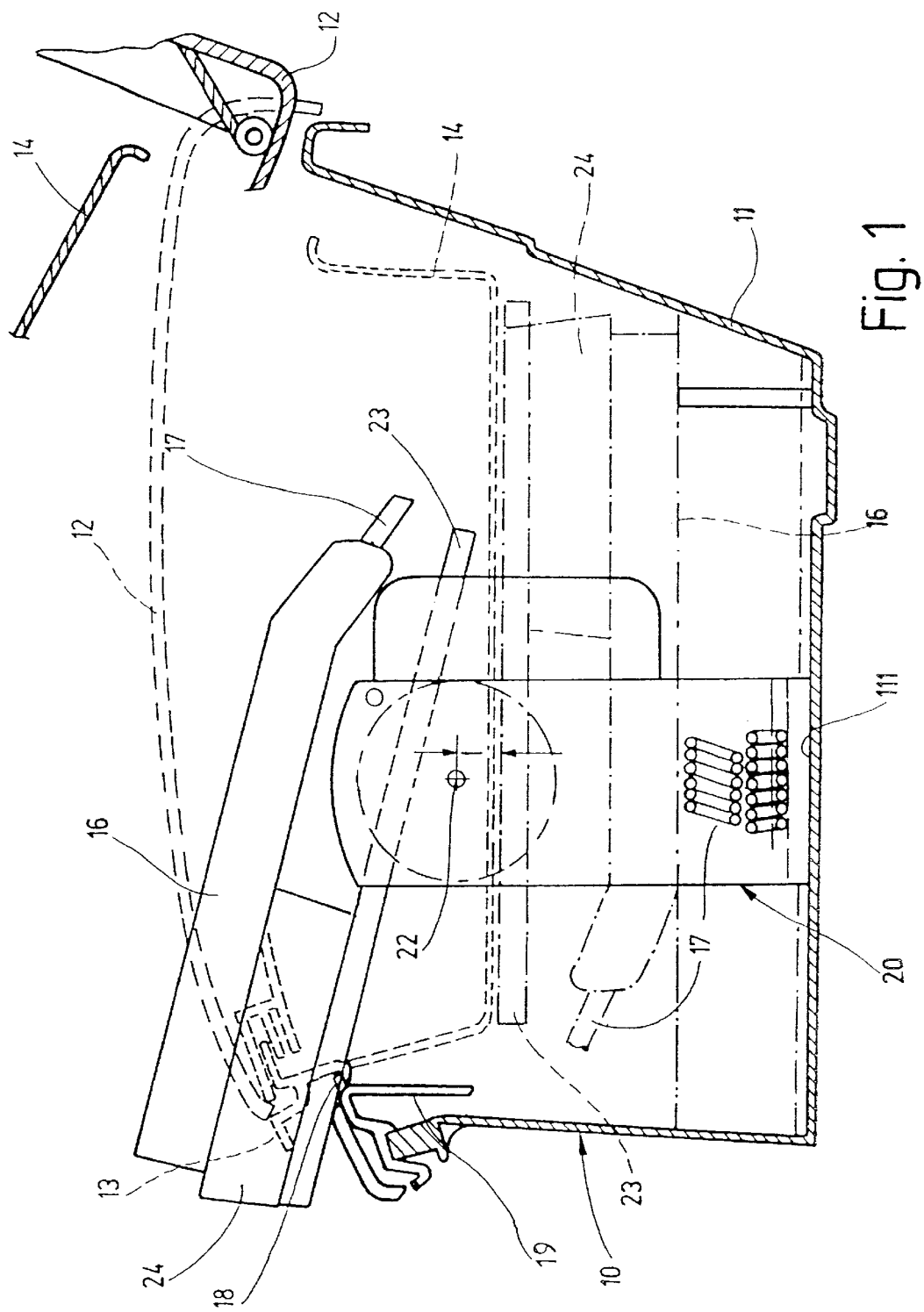
FIG. 1 is a partially schematic lateral view of a holding arrangement for the operating element of a telephone or a mobile telephone installed in a vehicle-side container.

FIG. 1 is a longitudinal sectional view of a vehicle-side container 10, for example, a so-called center console which is normally arranged between the driver seat and the front passenger seat of a passenger car. The container 10 has a container box 11, which is fastened on the vehicle bottom and is open on top, and a container lid 12 for closing the container box 11 which is swivellably held on the rearward upper transverse edge of the container box 11 and can be fixed by means of a locking pressure key 13 on the upper forward transverse edge of the container box 11. On the bottom side of the container lid 12, a depositing tray 14 is arranged which, when the container 10 is closed, thus when the container lid 12 is folded onto the container box 11, projects into the upper third of the interior of the container box 11. By means of the locking pressure key 13, the depositing tray 14 can optionally be connected with the container lid 12 and can be detached from it so that the container lid 12 can be folded up, on the one hand, with the depositing tray 14 in order to expose the interior of the container 11 and can be swivelled up, on the other hand, without the depositing tray 14 in order to permit an access to the depositing tray 14 which then, in turn, will keep the two lower thirds of the interior of the container 11 covered.

In FIG. 1, the container lid 12 is folded up together with the depositing tray 14 and is only partially shown. A broken line also shows the container lid 12 together with the depositing tray 14 in the closed position. Since the locking pressure key 13 is held on the container lid 12 and, in the closed position, reaches behind a locking nose 18 molded to a reinforcing frame 19, which is fastened to the upper container edge in a surrounding manner, this locking pressure key 13 is also shown by a broken line.

Figure 2:
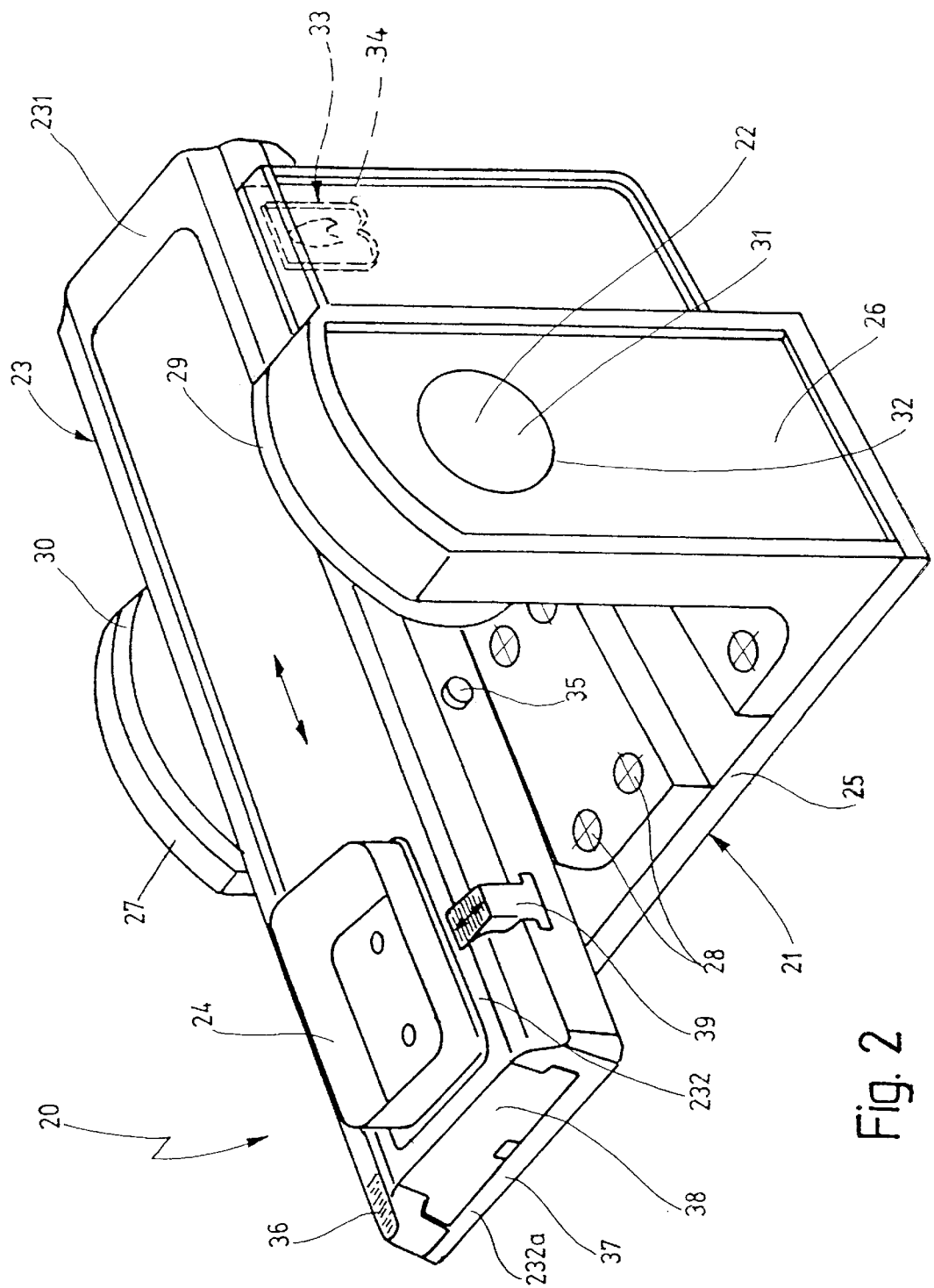
FIG. 2 is a partially schematic perspective view of the holding arrangement in FIG. 1.

The operating element of a telephone, in this case, the telephone receiver 16 with the dialing keyboard, is housed in the container 10. The connection cable of the telephone receiver 16 to the telephone is schematically illustrated in FIG. 1 by means of reference number 17. Instead of the telephone receiver 16, the handset of a mobile telephone can also be housed in the container 10. For a suitable housing, a holding arrangement 20 is provided which consists of a fork-shaped carrier 21 and a holding body 23 which is swivellably about a swivelling axis 22 aligned transversely with respect to the driving direction, in the carrier 21, which holding body 23 carries a receiving device 24 for the telephone receiver 16. As illustrated in FIG. 2, the carrier 21 consists of a carrying plate 25 which is constructed for a fastening on the bottom 111 of the container box 11, and of two carrying arms 26, 27 which project away from the carrying plate 25 at a right angle at a parallel distance from one another and which are fastened on the carrying plate 25. The fastening takes place, for example, by means of screws 28 which are screwed into corresponding threaded bores in the carrying plate 25. The swivelling shaft 22 is accommodated in the two parallel carrying arms 26, 27, specifically such that it is situated at a vertical distance 1 (FIG. 1) from the holding body 23. In the embodiment shown, this bearing of the holding body 23 in the carrying arms 26, 27 is implemented in that the holding body 23 is clamped between two coaxial rotary disks 29, 30, the clamping taking place at a radial distance 1 from the axis of the rotary disks 29, 30. Each rotary disk 29, 30 carries a coaxial journal 31 which is received in a bearing bore 32 in the carrying arm 26 or 27 (FIG. 2). By means of this swivel bearing, the holding body 23 can be swivelled from a removed position (in FIG. 1, illustrated by a dash-dotted line), in which the holding body 23 is situated below the swivelling shaft 22 and the receiving device 24 for the telephone receiver 16 points to the bottom 111 of the container box 11, by slightly less than 180° into a so-called offered position (illustrated by a solid line in FIG. 1) in which the holding body 23 is situated above the swivelling shaft 22 and is partially lifted out of the container box 11 and the receiving device 24 for the telephone receiver 16 points upwards.

When the telephone receiver 16 is inserted in the receiving device 24, this receiver, when not in use in the removed position of the holding body 23, is arranged close to the bottom 111 of the container box and is covered toward the top by the holding body 23. The container lid 12 can be closed, in which case the depositing tray 14 is lowered into the container box 11 until it reaches the holding body 23. For using the telephone, the container lid 12 must be folded up and the holding body 23 must be swivelled upwards about the swivelling axis 22, whereby, in the swivelling end position of the holding body 23, the telephone receiver 16 is situated on top in an easily accessible manner and can be gripped by the user without any problem.

For ensuring an optimal operating comfort, the holding body 23 is loaded by a driving spring, which is not shown, in the swivelling direction toward its offered position (shown by a solid line in FIG. 1) and is locked in its removed position by a locking device 33 against a swivelling by the driving spring. The driving spring can be implemented, for example, by one or two torsion springs which is/are disposed on a journal 31 and is/are supported on the one side on the holding body 23 and on the other side on the carrying arm 26 and 27. The locking device 33 is preferably constructed as a so-called touch system which—as indicated in FIG. 2—consists of a cardioid curve guide 34 and of a guide pin 35. When the holding body 23 is changed into its removed position, the guide pin 35 moves into the cardioid curve guide 34 and at the end is locked in the recess of the cardioid curve. By the application of a downward-directed force to the holding body 23, the locking can be released again, and after the release of the holding body 23, the guide pin 35 will move out of the cardioid curve guide 34 on its other side cheek. Such a "touch system" is used in various applications and is generally known in its construction and method of operation.

In order to, on the one hand, arrange the holding body 23 in its removed position as close as possible to the bottom 111 of the container box 11 and, on the other hand, ensure that, when the holding body 23 is changed into its offered position, the telephone receiver 16 is swivelled largely to the front out of the container box 11, the swivelling shaft 22 for the holding body 23 is arranged in the longitudinal direction of the holding body offset toward its center so that the holding body 23 is divided by the swivelling shaft 22 into a shorter and a longer body section 231 and 232. The swivelling direction of the holding body 23 from its removed position (illustrated by a dash-dotted line in FIG. 1) into its offered position (indicated in FIG. 1 by a solid line) is placed such that the shorter body section 231 swivels through between the carrying arms 26, 27. The receiving device 24 for the telephone receiver 16 is arranged in the longer body section 232.

When the swivelling end position is reached in the offered position, the holding body 23 is locked against a further rotating movement by means of a locking device on the carrying arms 26, 27. Of the locking device, which is not shown here in greater detail, FIG. 2 shows the unlocking pressure key 36 which must be pressed in manually for the swivelling of the holding body 23 out of its offered position, whereby the locking device is unlocked.

As illustrated in FIG. 2, the holding body 23 consists of a carriage bed 37 and of a sliding carriage 38 which is longitudinally guided in it and which carries the receiving device 24 for the telephone receiver 16. The sliding carriage 38 can be pushed out by way of the front end 232a of the holding body 23 which bounds the longer body section 232. The sliding-out takes place by a driving spring, such as a compression spring, which is not shown here and which is supported in the longitudinal direction of the holding body 23 between the sliding carriage 38 and the carriage bed 37. By means of a locking pressure key 39, the sliding carriage 38 is held against the force of the driving spring in its pulled-in position illustrated in FIG. 2. When the locking pressure key 39 is manually released, the driving spring pushes the sliding carriage 38 into its end position in which the receiving device 24 and thus the telephone receiver 16 is displaced very far toward the front so that, also when the seat position of the driver seat and/or the front passenger seat is adjusted toward the front, the telephone receiver 16 can be easily gripped. For changing the holding body 23 into its removed position, the sliding carriage 38 must first be pushed into the carriage bed 37 against the force of the driving springs until the locking pressure key 39 locks the sliding carriage 38 again on the carriage bed 37. Only then can the manual swivelling of the holding body 23 take place after the operation of the unlocking pressure key 36 in the described manner.

In the embodiment illustrated in FIG. 2, the guide of the sliding carriage 38 in the carriage bed 37 is constructed as a groove guide. Likewise, a so-called pillar guide can be used.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A holding arrangement for an operating element of a telephone adapted for installation into a container in a vehicle, the container having a receiving device arranged on a holding body for releasable fixing an operating element on the holding body the container being swivelable about a swivelling shaft aligned transversely to a longitudinal length of the container, wherein, in a removed position wherein the operating element is stored, the operating element rests completely in the container while the receiving device points downward to the container bottom, and in a use position allowing access to the operating element, the operating element is lifted at least partially out of the container while the receiving device points upward, wherein a fork-shaped carrier is provided for the swivel bearing of the holding body, which has a carrier plate constructed for fastening on a container bottom and two parallel carrying arms which project from the carrier plate at a right angle at a distance from one another, and wherein the swivelling shaft is accommodated in the two carrying arms at a vertical distance from the holding body such that, in removed position, the holding body is situated below the swivelling axis and, in the use position, is situated above the swivelling axis.

2. An arrangement according to claim 1, wherein the holding body is biased by a driving spring in a swivelling direction toward the use position and, in the removed position, is locked against swivelling by a locking device.

3. An arrangement according to claim 2, wherein the locking device is constructed such that, when the holding body is moved into the removed position, the locking device automatically locks the holding body, and the locking can be released by a brief pressure on the locked holding body in a downward direction.

4. An arrangement according to claim 1, wherein the swivelling shaft is arranged in the longitudinal direction of the holding body and is offset toward a center thereof and divides the holding body into a shorter and a longer body section, and wherein the swivelling direction of the holding body from the removed position into the use position and vice versa is defined such that the shorter body section swivels through and between the carrying arms of the carrier.

5. An arrangement according to claim 2, wherein the swivelling shaft is arranged in the longitudinal direction of the holding body and is offset toward a center thereof and divides the holding body into a shorter and a longer body section, and wherein the swivelling direction of the holding body from the removed position into the use position and vice versa is defined such that the shorter body section swivels through and between the carrying arms of the carrier.

6. An arrangement according to claim 3, wherein the swivelling shaft is arranged in the longitudinal direction of the holding body and is offset toward a center thereof and divides the holding body into a shorter and a longer body section, and wherein the swivelling direction of the holding body from the removed position into the use position and vice versa is defined such that the shorter body section swivels through and between the carrying arms of the carrier.

7. An arrangement according to claim 4, wherein the receiving device for the operating element is arranged in the longer body section of the holding body.

8. An arrangement according to claim 6, wherein the receiving device for the operating element is arranged in the longer body section of the holding body.

9. An arrangement according to claim 1, wherein the holding body comprises a carriage bed and a sliding carriage longitudinally guided therein, and wherein the receiving device for the operating element is arranged on the sliding carriage.

10. An arrangement according to claim 3, wherein the holding body comprises a carriage bed and a sliding carriage longitudinally guided therein, and wherein the receiving device for the operating element is arranged on the sliding carriage.

11. An arrangement according to claim 7, wherein the holding body comprises a carriage bed and a sliding carriage longitudinally guided therein, and wherein the receiving device for the operating element is arranged on the sliding carriage.

12. An arrangement according to claim 9, wherein the sliding carriage can be slid out by way of a front end of the carriage bed which bounds the longer body section.

13. An arrangement according to claim 9, wherein the sliding carriage is biased by a driving spring in the slide-out direction and, in the pull-in position, is locked against the force of the driving spring by means of a locking pressure key on the carriage bed.

14. An arrangement according to claim 11, wherein the sliding carriage is biased by a driving spring in the slide-out direction and, in the pull-in position, is locked against the force of the driving spring by means of a locking pressure key on the carriage bed.

15. An arrangement according to claim 1, wherein the holding body is non-rotatably fixed in the use position by means of a manually unlockable locking device.

16. An arrangement according to claim 2, wherein the holding body is non-rotatably fixed in the use position by means of a manually unlockable locking device.

17. An arrangement according to claim 6, wherein the holding body is non-rotatably fixed in the use position by means of a manually unlockable locking device.

18. A telephone handset holding assembly for holding a telephone handset in a motor vehicle container, comprising:

a holding body with a handset receiving device which accommodates releasable holding of said handset, a holding body carrier including a pair of spaced carrying arms fixed in use to a container bottom, and a pivotal connection between said carrying arms and said holding body which accommodates pivotal movement of the holding body about a pivot axis between a handset stowage position and a hand set access position, wherein said holding body and pivotal connection are configured such that said holding body is disposed below the pivot axis when in said stowage position and above said pivot axis when in said access position.

19. An assembly according to claim 18, wherein a driving spring is provided for aiding movement of the holding body toward the access position, and wherein a releasable locking device is provided for locking the holding body in the stowage position against the force of the driving spring.

20. An assembly according to claim 19, wherein said releasable locking device is automatically engaged when said holding device is moved into the stowage position.

21. An assembly according to claim 20, wherein said releasable locking device is released in response to brief downward pressure on the holding body.

22. An assembly according to claim 18, wherein said pivot axis is disposed offset from a longitudinal center of the holding body such that a shorter end of the holding body swivels between the carrying arms during movement between the stowage and access positions.

23. An assembly according to claim 18, wherein said holding body receiving device faces downward when in said stowage position and upward when in said access position.

* * * * *